(12) United States Patent
Ibrahim et al.

(10) Patent No.: US 12,319,574 B1
(45) Date of Patent: Jun. 3, 2025

(54) BIOMASS DERIVED NANOCOMPOSITE FOR HYDROGEN PRODUCTION

(71) Applicant: IMAM MOHAMMAD IBN SAUD ISLAMIC UNIVERSITY, Riyadh (SA)

(72) Inventors: Mohamed Nady Abd El-Hameed Ibrahim, Riyadh (SA); Abdulrahman G. Alhamzani, Riyadh (SA); Mortaga Mohamed M. Abou-Krisha, Riyadh (SA); Abdullah A. Aldakhil, Riyadh (SA); Zainab Mohammed Abdullah Almarhoon, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/051,086

(22) Filed: Feb. 11, 2025

(51) Int. Cl.
| | | |
|---|---|---|
| *C01B 3/00* | (2006.01) | |
| *B01J 31/06* | (2006.01) | |
| *B01J 37/03* | (2006.01) | |
| *C01B 3/06* | (2006.01) | |
| *C08J 3/075* | (2006.01) | |
| *C08J 3/24* | (2006.01) | |

(52) U.S. Cl.
CPC .............. *C01B 3/065* (2013.01); *B01J 31/06* (2013.01); *B01J 37/036* (2013.01); *C08J 3/075* (2013.01); *C08J 3/242* (2013.01); *C01B 2203/1082* (2013.01); *C08J 2301/02* (2013.01)

(58) Field of Classification Search
None
See application file for complete search history.

(56) References Cited

U.S. PATENT DOCUMENTS

| | | |
|---|---|---|
| 2017/0263945 A1 | 9/2017 | Li et al. |
| 2018/0186664 A1 | 7/2018 | Alkendi et al. |
| 2023/0348803 A1 | 11/2023 | Hossain et al. |
| 2024/0261760 A1 | 8/2024 | Alhamzani et al. |

OTHER PUBLICATIONS

Santoso et al, Eco-friendly cellulose-bentonite porous composite hydrogels for adsorptive removal of azo dye and soilless culture, cellulose, 26, 3339-3358 (Year: 2019).*

Lai et al, the role of natural hybrid nanobentonite/nanocellulose in enhancing the water resistance properties of the biodegradable thermoplastic starch, De Gruyter (Year: 2023).*

(Continued)

*Primary Examiner* — Stefanie J Cohen
(74) *Attorney, Agent, or Firm* — Oblon, McClelland, Maier & Neustadt, L.L.P.

(57) ABSTRACT

A method of hydrolyzing a borohydride includes extracting nanocellulose from date palm waste and forming nanocellulose crystals. The method includes dispersing the NCC and bentonite powder in water, followed by adding a cross-linking acid solution and heating to form a nanocellulose catalyst in the form of a hydrogel. The method includes reacting a borohydride with water in the presence of the nanocellulose catalyst at a temperature ranging from 20 to 45° C. to produce hydrogen ($H_2$) gas.

20 Claims, 8 Drawing Sheets

(56) References Cited

OTHER PUBLICATIONS

Hicham Aitbella, et al., "Schiff Base Functionalized Cellulose: Towards Strong Support-Cobalt Nanoparticles Interactions for High Catalytic Performances", Molecules 2024, vol. 29, 1734, Apr. 11, 2024, 19 pages.

K. Rambabu, et al., "Molybdenum disulfide decorated palm oil waste activated carbon as an efficient catalyst for hydrogen generation by sodium borohydride hydrolysis", International Journal of Hydrogen Energy, vol. 44, Apr. 11, 2019, pp. 14406-14415.

* cited by examiner

BIOMASS DERIVED NANOCOMPOSITE FOR HYDROGEN PRODUCTION

BACKGROUND

Technical Field

The present disclosure is directed towards a method of hydrolyzing a borohydride, and more particularly, for the production of hydrogen ($H_2$), using a bentonite-cellulose nanocomposite hydrogel derived from plant-based natural sources and local biomass.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The dual challenge of rising energy demands, and environmental degradation has driven the search for cleaner and more sustainable energy solutions. Hydrogen ($H_2$) may be a promising energy carrier due to its highest gravimetric energy density and ability to form only environmentally benign byproducts, such as water ($H_2O$).

Conventionally, hydrogen is produced on a large scale through a steam-methane reforming process. This process requires high energy input, relies on fossil fuels, and produces carbon dioxide as a byproduct. Another conventional method of hydrogen production, electrolysis, splits water into hydrogen and oxygen, offering a cleaner alternative, but high energy demands and costs remain challenges. Phototrophic microbes and photocatalysis-based methods may also be used to produce hydrogen, but both methods suffer from low efficiency and scalability. Additionally, the hydrolysis of metal hydrides provides controlled hydrogen release but requires specialized materials and conditions, limiting its widespread adoption. Further, despite significant progress in hydrogen generation technologies, conventional methods also face challenges in achieving 100% hydrogen extraction. Thus, achieving stability, large scalability, low cost, and industrial feasibility for hydrogen production remains a priority in the ongoing transition from fossil fuels to clean energy solutions.

Accordingly, one object of the present disclosure is to provide a method of hydrolyzing a borohydride using a nanocellulose-bentonite catalyst to produce $H_2$.

SUMMARY

In an exemplary embodiment, a method of hydrolyzing a borohydride is described. The method comprises extracting nanocellulose from date palm waste and forming nanocellulose crystals (NCC) therefrom. The method further comprises dispersing the nanocellulose crystals and bentonite powder in water, then adding a cross-linking acid solution and heating to obtain a nanocellulose catalyst in the form of a hydrogel. Furthermore, the method comprises reacting a borohydride with water in the presence of the nanocellulose catalyst at a temperature of 20 to 45 degrees Celsius (° C.) to obtain hydrogen ($H_2$) gas. The borohydride is at least one selected from the group comprising of sodium borohydride ($NaBH_4$), lithium borohydride ($LiBH_4$), calcium borohydride ($Ca(BH_4)_2$), potassium borohydride ($KBH_4$), rubidium borohydride ($RbBH_4$), and ammonium borohydride ($NH_4BH_4$).

In some embodiments, the cross-linking acid solution comprises at least one selected from the group comprising of citric acid, oxalic acid, tartaric acid, and formic acid.

In some embodiments, the dispersing comprises a weight ratio of 1:3 to 3:1 of nanocellulose crystals to bentonite in water.

In some embodiments, the nanocellulose catalyst is obtained by heating a mixture of the nanocellulose crystals, bentonite powder, water and the cross-linking acid solution to a temperature of 55 to 65° C. for 15 to 45 minutes (min).

In some embodiments, the borohydride is sodium borohydride.

In some embodiments, the nanocellulose catalyst is characterized by a Fourier transform infrared spectroscopy (FT-IR) spectrum comprising a sharp peak at 1690 to 1700 $cm^{-1}$.

In some embodiments, the cross-linking acid solution comprises citric acid.

In some embodiments, the dispersing comprises a weight ratio of 1:1 of nanocellulose crystals to bentonite in water.

In some embodiments, the reacting comprises reacting the borohydride with water in the presence of the nanocellulose catalyst at a temperature of 40° C. to form $H_2$ gas.

In some embodiments, the reacting forms a volume of 10 to 120 milliliters (mL) of the $H_2$ gas in 20 min or less when 0.5 to 1 grams (g) of the borohydride is reacted with water in the presence of 0.5 to 1 g of the nanocellulose catalyst.

In some embodiments, the reacting of the borohydride with water in the presence of the nanocellulose catalyst has an activation energy of 75 to 85 kilojoules per mole (KJ/mol).

In some embodiments, the reacting forms a volume of at least 60 mL of the $H_2$ gas in 5 min or less when 0.5 to 1 g of the borohydride is reacted with water in the presence of 0.5 to 1 g of the nanocellulose catalyst.

In some embodiments, the reacting of the borohydride with water in the presence of the nanocellulose catalyst has a change in enthalpy ($\Delta H$) of 70 to 80 KJ/mol.

In some embodiments, the nanocellulose catalyst is obtained by dispersing nanocellulose crystals and bentonite powder in water then adding a cross-linking acid solution in a weight ratio of 1:15 to 15:1 of nanocellulose crystals and bentonite powder in water to cross-linking acid solution.

In some embodiments, the nanocellulose catalyst is obtained by heating a mixture of the nanocellulose crystals, bentonite powder, water and the cross-linking acid solution to a temperature of 60° C. for 30 min.

In some embodiments, the reacting forms a volume of at least 100 mL of the $H_2$ gas in 10 min or less when 0.5 to 1 g of the borohydride is reacted with water in the presence of 0.5 to 1 g of the nanocellulose catalyst.

In some embodiments, the reacting of the borohydride with water in the presence of the nanocellulose catalyst has a change in entropy ($\Delta S$) of 0.05 to 0.45 kilojoules per mole per kelvin (KJ/mol·K).

In some embodiments, the dispersing comprises dispersing the nanocellulose crystals and bentonite powder in water, then adding a cross-linking acid solution in a weight ratio of 1:15 to 1:10 of nanocellulose crystals and bentonite powder in water to cross-linking acid solution.

In some embodiments, the reacting forms a volume of at least 80 mL of the $H_2$ gas in 15 min or less when 0.5 to 1 g of the borohydride is reacted with water in the presence of 0.5 to 1 g of the nanocellulose catalyst.

In some embodiments, the nanocellulose catalyst has a hydrogen generate rate (HGR) of at least 200 milliliters per minute per gram (mL/min·g).

The foregoing general description of the illustrative embodiments and the following detailed description thereof are merely exemplary aspects of the teachings of this disclosure and are not restrictive.

BRIEF DESCRIPTION OF DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
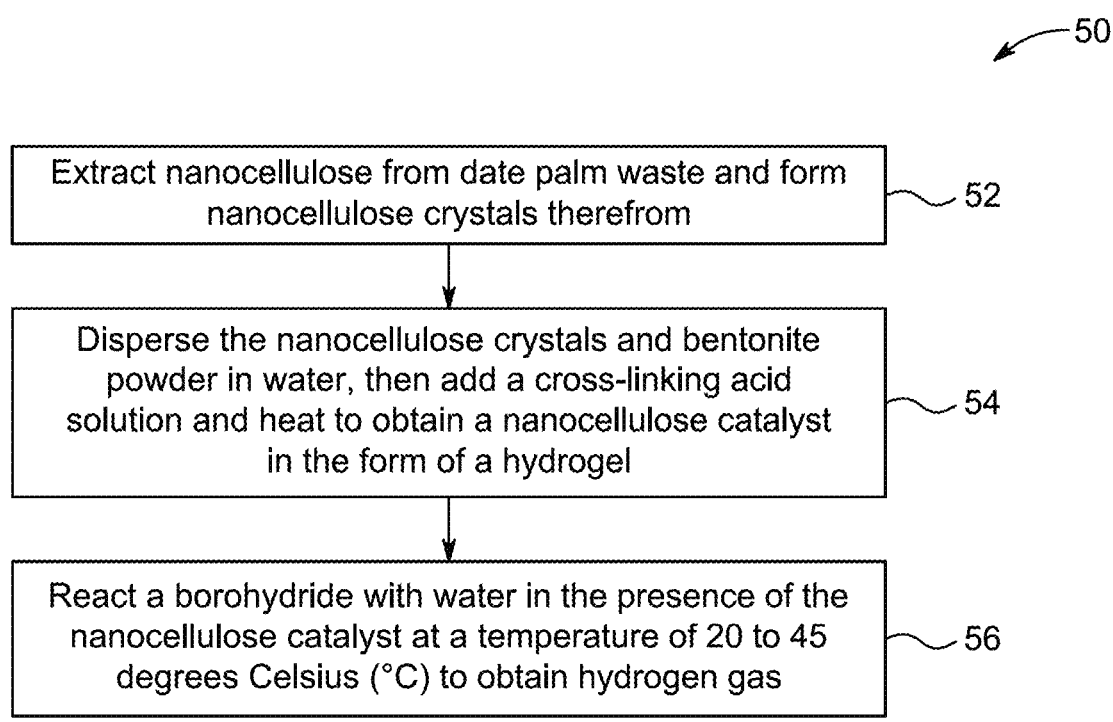
FIG. 1 illustrates a schematic flow chart of a method of hydrolyzing a borohydride, according to certain embodiments.

When describing the present disclosure, the terms used are to be construed in accordance with the following definitions, unless a context dictates otherwise.

Embodiments of the present invention will now be described more fully herein after with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

When amounts, concentrations, dimensions and other parameters are expressed in the form of a range, a preferable range, an upper limit value, a lower limit value or preferable upper and limit values, it should be understood that any ranges obtainable by combining any upper limit or preferable value with any lower limit or preferable value are also specifically disclosed, irrespective of whether the obtained ranges are clearly mentioned in the context.

As used herein, the term 'room temperature' or 'ambient temperature' refers to a temperature range of 23±3° C. in the present disclosure.

As used herein, the term 'nanoparticles (NPs)' refers to particles having a particle size of 1 to 100 nanometers (nm) within the scope of the present invention.

As used herein, the term 'nanocomposite' refers to a composite material that has at least one component with a grain size measured in nm.

As used herein, the term 'hydrogel' refers to a three-dimensional (3D) network composed of hydrophobic polymers synthesized by crosslinking water-soluble polymers. Hydrogels may retain a large quantity of water within their network without disturbing their original structure, imparting flexibility and swelling properties to the hydrogel structure.

As used herein, the term 'hydrogen generation' refers to the process of producing $H_2$ gas from various sources using different methods. Hydrogen generation in the context of the present disclosure includes a chemical reaction in which covalent bonds are broken and $H_2$ is formed. Methods of hydrogen generation include water electrolysis, steam methane reforming (SMR), partial oxidation, biomass gasification, and photoelectrochemical (PEC) water splitting.

As used herein, the term 'water electrolysis' refers to a process in which electricity is used to split water into hydrogen and oxygen. The splitting occurs in two partial reactions that take place at the two electrodes in the electrolysis cell (e.g., the cathode and the anode). When voltage is applied, hydrogen is produced at the cathode and oxygen at the anode.

As used herein, the term 'steam methane reforming' refers to a process in which methane from natural gas is heated, with steam, usually with a catalyst, to produce a mixture of carbon monoxide and hydrogen used in organic synthesis and as a fuel.

As used herein, the term 'partial oxidation' refers to a process where a hydrocarbon fuel (like natural gas) reacts with a limited amount of oxygen, producing a mixture of hydrogen and carbon monoxide (syngas) instead of fully combusting to carbon dioxide and water.

As used herein, the term 'biomass gasification' refers to a thermochemical process where organic materials (biomass) are heated at high temperatures with a controlled amount of oxygen and steam to create a gas mixture (e.g., syngas) comprising hydrogen, carbon monoxide, and carbon dioxide, allowing for the extraction and purification of hydrogen.

As used herein, the term 'photoelectrochemical (PEC) water splitting' refers to a process where sunlight is used to split water molecules into hydrogen and oxygen gas through a photoelectrochemical (PEC) cell, generating hydrogen fuel directly from solar energy using semiconductor materials called photoelectrodes.

As used herein, the term 'bentonite' refers to a naturally occurring, highly absorbent clay material part of the smectite class of clays. Bentonite may also be known as montmorillonite clay. Bentonite is characterized by its ability to absorb large quantities water.

As used herein, the term 'cellulose' refers to a complex, naturally occurring polysaccharide composed of long chains of glucose molecules linked by β-1,4-glycosidic bonds. It is the primary structural component of plant cell walls.

As used herein, the term 'Fourier-transform infrared (FT-IR) spectrum' refers to a spectroscopic technique that measures how a sample absorbs infrared light at different wavelengths, revealing the vibrational modes of its molecular bonds. The resulting spectrum displays peaks that correspond to specific functional groups in the sample, allowing for compound identification.

As used herein, the term 'activation energy' refers a minimum amount of energy required for a chemical reaction to occur, essentially representing the energy barrier that must be overcome for the reaction to proceed.

As used herein, the term 'enthalpy (H)' refers a thermodynamic quantity equivalent to the total heat content of a system. It is equal to the internal energy of the system plus the product of pressure and volume.

As used herein, the term 'change in enthalpy (ΔH)' refers to the heat content of a system. The change in enthalpy of a reaction is equivalent to the amount of energy lost or gained during the reaction.

As used herein, the term 'entropy(S)' refers to the measure of a system's thermal energy per unit temperature that is unavailable for doing work. Because work is obtained from ordered molecular motion, the amount of entropy is a measure of the molecular disorder, or randomness, of a system.

As used herein, the term 'change in entropy (ΔS)' refers to a measure of the increase or decrease in disorder within a thermodynamic system, indicating how much the randomness of the system's molecules changes during a process. A positive ΔS means an increase in disorder, while a negative ΔS signifies a decrease in disorder.

As used herein, the term 'hydrogen generation rate (HGR)' refers to the amount of hydrogen gas produced per unit of time. HGR is typically measured in units liters per minute (L/min) or kilograms per hour (kg/h).

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material. In addition, the present disclosure is intended to include all isotopes of atoms occurring in the present compounds and complexes. Isotopes include those atoms having the same atomic number but different mass numbers. By way of general example, and without limitation, isotopes of hydrogen include deuterium and tritium, and isotopes of carbon include $^{13}C$ and $^{14}C$. Isotopes of oxygen include $^{16}O$, $^{17}O$, and $^{18}O$. Isotopically-labeled compounds of the disclosure may generally be prepared by conventional techniques known to those skilled in the art or by processes analogous to those described herein, using an appropriate isotopically-labeled reagent in place of the non-labeled reagent otherwise employed.

Aspects of the present disclosure are directed toward a method of hydrolyzing a borohydride, e.g., sodium borohydride ($NaBH_4$), by reacting the borohydride with water in the presence of a nanocomposite of bentonite and cellulose (bentonite-cellulose nanocomposite). The catalyst facilitates efficient and rapid release of $H_2$ from $NaBH_4$, making it a green alternative for hydrogen production.

FIG. 1 illustrates a schematic flow chart of a method 50 of hydrolyzing a borohydride. The order in which the method 100 is described is not intended to be construed as a limitation, and any number of the described method steps can be combined to implement the method 100. Additionally, individual steps may be removed or skipped from the method 100 without departing from the spirit and scope of the present disclosure.

At step 52, the method 50 comprises extracting nanocellulose from date palm waste and forming nanocellulose crystals (NCC) therefrom. In an embodiment, the date palm waste may be derived from any date palm tree component, including leaves, bark, husk, trunk, leaf sheath, tree leaflets, pedicels, and seeds. In a preferred embodiment, the date palm waste is derived from date palm tree leaflets. In some embodiments, the method comprises cutting the date palm waste into small pieces, then soaking in water. The water may be tap water, distilled water, deionized water, deionized distilled water, reverse osmosis water, and the like. In some embodiments, the date palm waste is cut into pieces having an average particles size of 1 centimeter (cm) or less, preferably 0.8 cm or less, preferably 0.6 cm or less, most preferably 0.5 cm or less. In an embodiment, the method further comprises drying the date palm waste at a temperature of 20 to 25° C. for 6 to 24 h. In one embodiment, the drying comprises drying the date palm waste for 7 to 23 h, preferably 8 to 22 h, preferably 9 to 21 h, preferably 10 to 20 h, preferably 11 to 19 h, preferably 12 to 18 h, preferably 12 to 17 h, preferably 12 to 16 h, preferably 12 to 15 h, preferably 12 to 14 h, preferably 12 to 13 h, most preferably 12 h. In some embodiments, the method further comprises grinding the dried palm waste into palm waste particles having an average particle size of 5 millimeters (mm) or less. The method further comprises treating the palm waste particles with an acid solution at a temperature of at least 75° C. for 1 to 3 h to obtain treated microparticles. In an embodiment, the acid solution comprises at least one acid selected from the group consisting of nitric acid ($HNO_3$), hydrochloric acid (HCl), perchloric acid ($HClO_4$), hydrobromic acid (HBr), hydroiodic acid (HI), and sulfuric acid ($H_2SO_4$). In another embodiment, the treating comprises treating the palm waste particles with an acid solution at a temperature of at least 80° C., preferably at least 85° C., most preferably at least 90° C. In some embodiments, the treating comprises treating the palm waste particles with an acid solution for 1.5 to 2.5 h, most preferably 2 h. In a preferred embodiment, the treating comprises treating the palm waste particles with an acid solution comprising sulfuric acid at a temperature of at least 90° C. for 2 h to obtain treated palm waste. In another embodiment, the method further comprises hydrolyzing the treated palm waste with a potassium hydroxide (KOH) solution for 1 to 3 h at a temperature of 70 to 110° C. to obtained hydrolyzed. In an embodiment, the hydrolyzing comprises hydrolyzing the treated palm waste with a KOH solution for 1.5 to 2.5 h, most preferably 2 h. In an embodiment, the hydrolyzing comprises hydrolyzing the treated palm waste with a KOH solution at a temperature of 75 to 105° C., preferably 80 to 100° C., preferably 85 to 95° C., most preferably 90° C. In a preferred embodiment, the hydrolyzing comprises hydrolyzing the treated palm waste with a potassium hydroxide (KOH) solution for 1 to 3 h at a temperature of 70 to 110° C. to obtain hydrolyzed palm waste. In some embodiments, the method further comprises bleaching the hydrolyzed palm waste with a sodium chlorite ($NaClO_2$) solution then stirring for 1 to 5 h at a temperature of 50 to 90° C. to obtain a cellulose. In another embodiment, the stirring comprises stirring for 1.5 to 4.5 h, preferably 2 to 4 h, preferably 2.5 to 4 h, preferably 3 to 4 h, preferably 3.5 to 4 h, most preferably 4 h. In some embodiments, the stirring comprises stirring at a temperature of 55 to 85° C., preferably 60 to 80° C., preferably 65 to 75° C., preferably 70 to 75° C., most preferably 75° C. The method further comprises treating the cellulose with a second acid solution at a temperature of 40 to 60° C. for 15 to 60 min then centrifuging at a rate of 2,000 to 8,000 rpm for 10 to 30 min to obtain a suspension. In some embodiments, the second acid solution comprises at least one acid selected from the group consisting of $HNO_3$, HCl, $HClO_4$, HBr, HI, and $H_2SO_4$. In a preferred embodiment, the second acid solution comprises $H_2SO_4$. In another embodiment, the treating comprises treating the cellulose with a second acid solution at a temperature of 45 to 55° C., preferably 45 to 50° C., most preferably 45° C. In another embodiment, the treating comprises treating the cellulose with a second acid solution for 20 to 55 min, preferably 25 to 50 min, preferably 30 to 45 min, preferably 35 to 45 min, preferably 40 to 45 min, most preferably 45 min. In some embodiments, the centrifuging comprises centrifuging at a rate of 2,500 to 7,500 rpm, preferably 3,000 to 7,000 rpm, preferably 3,500 to 6,500 rpm, preferably 4,000 to 6,000 rpm, preferably 4,500 to 5,500 rpm, most preferably 5,000 rpm. In another embodiment, the centrifuging comprises centrifuging for 12 to 28 min, preferably 12 to 26 min, preferably 14 to 24 min, preferably 16 to 22 min, preferably 18 to 20 min, most preferably 20 min. In a preferred embodiment, the method comprises treating the cellulose with a second acid solution at a temperature of 45° C. for 45 min, then centrifuging for 20 min at a rate of 5,000 rpm to obtain a suspension. In some embodiments, the method further comprises sonicating the suspension for 1 to 20 min, then drying to obtain the NCC. In another embodiment, the sonicating comprises sonicating the suspension for 2 to 19 min, preferably 3 to 18 min, preferably 4 to 17 min, preferably 5 to 16 min, preferably 6 to 15 min, preferably 7 to 14 min, preferably 8 to 13 min, preferably 9 to 12 min, most preferably 10 min.

At step 54, the method 50 comprises dispersing the NCC and bentonite powder in water, then adding a cross-linking acid solution and heating to obtain a nanocellulose catalyst in the form of a hydrogel. The water may be tap water, distilled water, double-distilled water, deionized water, deionized distilled water, reverse osmosis water, and the like. In a preferred embodiment, the water is distilled water. In some embodiments, the dispersing comprises dispersing a weight ratio of 1:3 to 3:1 of NCC to bentonite in water. In another embodiment, the dispersing comprises dispersing a weight ratio of 1:2.5 to 2.5:1 of NCC to bentonite in water, preferably 1:2 to 2:1, preferably 1:1.5 to 1.5:1, most preferably 1:1 of NCC to bentonite in water. In a preferred embodiment, the dispersing comprises dispersing a weight ratio of 1:1 of NCC to bentonite in water. In some embodiments, the nanocellulose catalyst is obtained by dispersing NCC and bentonite powder in water then adding a cross-linking acid solution in a weight ratio of 1:15 to 15:1 NCC and bentonite powder in water to cross-linking acid solution. In some embodiments, the dispersing comprises dispersing the NCC and bentonite powder in water, then adding a cross-linking acid solution in a weight ratio of 1:15 to 14:1, preferably 1:15 to 13:1, preferably 1:15 to 12:1, preferably 1:15 to 11:1 preferably 1:15 to 10:1, preferably 1:15 to 9:1, preferably 1:15 to 8:1, preferably 1:15 to 7:1, preferably 1:15 to 6:1, preferably 1:15 to 5:1, preferably 1:15 to 4:1, preferably 1:15 to 3:1, preferably 1:15 to 2:1 preferably 1:15 to 1:1, preferably 1:15 to 1:2, preferably 1:15 to 1:3, preferably 1:15 to 1:4, preferably 1:15 to 1:5, preferably 1:15 to 1:6, preferably 1:15 to 1:7, preferably 1:15 to 1:8, preferably 1:15 to 1:9, preferably 1:15 to 1:10 NCC and bentonite powder in water to cross-linking acid solution. In an embodiment, dispersing may include, but is not limited to, stirring, swirling, sonicating, or a combination thereof to form the resultant mixture. A cross-linking acid solution is a chemical mixture that comprises an acid-based cross-linking agent designed to react with functional groups located on the reaction molecules. This reaction results in the formation of chemical bonds between the molecules, leading to the creation of a network structure. In the present case, nanocellulose particles comprise hydroxyl (—OH) groups on at least one surface. The hydroxyl groups readily react with the cross-linking acid solution, resulting in covalent bonds that link the nanocellulose particles together, thus forming a network. The interconnected nature of this network enhances the strength, stability, and functional characteristics of the nanocellulose. In an embodiment, the cross-linking acid solution comprises at least one selected from the group comprising citric acid, oxalic acid, tartaric acid, and formic acid. In a preferred embodiment, the cross-linking acid solution comprises citric acid. In some embodiments, the nanocellulose catalyst is obtained by heating a mixture of the NCC, bentonite powder, water and the cross-linking acid solution to a temperature of 55 to 65° C. for 15 to 45 min. In some embodiments, the heating is carried out by heating appliances such as hot plates, furnace, heating mantles ovens, microwaves, autoclaves, tapes, oil baths, salt baths, sand baths, air baths, hot-tube furnaces, hot-air guns, hydrothermal heating, flash heating, infrared (IR) heating, plasma heating, and other heating appliances known in the art. In some embodiments, the nanocellulose catalyst is obtained by heating a mixture of the NCC, bentonite powder, water and the cross-linking acid solution to a temperature of 56 to 64° C., preferably 57 to 63° C., preferably 58 to 62° C., preferably 59 to 61° C., most preferably 60° C. In another embodiment, the nanocellulose catalyst is obtained by heating a mixture of the NCC, bentonite powder, water and the cross-linking acid solution for 15 to 45 min, preferably 20 to 40 min, preferably 25 to 35 min, most preferably 30 min. In a preferred embodiment, the nanocellulose catalyst is obtained by heating a mixture of the NCC, bentonite powder, water and the cross-linking acid solution to a temperature of 60° C. for 30 min.

At step 56, the method 50 comprises reacting a borohydride with water in the presence of the nanocellulose catalyst at a temperature of 20 to 45° C. to obtain $H_2$ gas. Preferably the borohydride is added to a water solution or suspension of the nanocellulose catalyst in a one-pot reaction. In another embodiment the borohydride is reacted with water in a first reaction vessel in the absence of the nanocellulose catalyst to release a first amount of hydrogen and form a partially hydrolyzed borohydride solution, then the partially hydrolyzed borohydride solution is mixed with an aqueous solution or suspension of the nanocellulose catalyst in a second reaction vessel to release a second amount of hydrogen gas. In some embodiments, the borohydride is at least one selected from the group comprising $NaBH_4$, $LiBH_4$, $Ca(BH_4)_2$, $KBH_4$, $RbBH_4$, and $NH_4BH_4$. In a preferred embodiment, the borohydride is $NaBH_4$. In this reaction, $NaBH_4$ acts a reducing agent which reduces water to produce $H_2$ gas. In some embodiments, the reacting comprises reacting a borohydride with water in the presence of the nanocellulose catalyst at a temperature of 21 to 45° C., preferably 22 to 45° C., preferably 23 to 45° C., preferably 24 to 45° C., preferably 25 to 45° C., preferably 26 to 45°

C., preferably 27 to 45° C., preferably 28 to 45° C., preferably 29 to 45° C., preferably 30 to 45° C., preferably 31 to 45° C., preferably 32 to 45° C., preferably 33 to 45° C., preferably 34 to 45° C., preferably 35 to 45° C., preferably 36 to 45° C., preferably 37 to 45° C., preferably 38 to 45° C., preferably 39 to 45° C., preferably 40 to 45° C., preferably 41 to 45° C., preferably 42 to 45° C., preferably 43 to 45° C., preferably 44 to 45° C., most preferably 45° C. to obtain $H_2$ gas. In some embodiments, the reaction of the borohydride with water in the presence of the nanocellulose catalyst has an activation energy of 75 to 85 KJ/mol. In another embodiment, the reaction of the borohydride with water in the presence of the nanocellulose catalyst has an activation energy of 76 to 84 KJ/mol, preferably 77 to 83 KJ/mol, preferably 78 to 82 KJ/mol, preferably 79 to 81 KJ/mol, most preferably 80 to 81 KJ/mol. In a preferred embodiment, the reaction of the borohydride with water in the presence of the nanocellulose catalyst has an activation energy of 80.6 KJ/mol. In some embodiments, the reacting of the borohydride with water in the presence of the nanocellulose catalyst has a change in enthalpy ($\Delta H$) of 70 to 80 KJ/mol. In another embodiment, the reacting of the borohydride with water in the presence of the nanocellulose catalyst has a $\Delta H$ of 71 to 79 KJ/mol, preferably 72 to 78 KJ/mol, preferably 73 to 77 KJ/mol, preferably 74 to 76 KJ/mol, most preferably 75 to 76 KJ/mol. In a preferred embodiment, the nanocellulose catalyst has $\Delta H$ value of 75.4 KJ/mol. In some embodiments, the reacting of the borohydride with water in the presence of the nanocellulose catalyst has a change in entropy ($\Delta S$) of 0.05 to 0.45 KJ/mol·K. In another embodiment, the reacting of the borohydride with water in the presence of the nanocellulose catalyst has a $\Delta S$ of 0.10 to 0.40 KJ/mol·K, preferably 0.15 to 0.35 KJ/mol·K, preferably 0.20 to 0.30 KJ/mol·K, most preferably 0.25 to 0.30 KJ/mol·K. In a preferred embodiment, the nanocellulose catalyst has $\Delta S$ value of 0.26 KJ/mol·K.

In some embodiments, the reacting forms a volume of 10 to 120 mL, preferably 20 to 110 mL, preferably 30 to 100 mL, preferably 40 to 90 mL, preferably 50 to 80 mL, preferably 60 to 70 mL of the $H_2$ gas in 20 min or less when 0.5 to 1 g, preferably 0.6 to 0.9 g, and preferably 0.7 to 0.8 g of the borohydride is reacted with water in the presence of 0.5 to 1 g, preferably 0.6 to 0.9 g, and preferably 0.7 to 0.8 g of the nanocellulose catalyst. In some embodiments, the reacting forms a volume of at least 60 mL, preferably 65 mL, preferably 70 mL, preferably 75 mL, preferably 80 mL, preferably 85 mL, preferably 90 mL, preferably 95 mL, and preferably 100 mL of the $H_2$ gas in 5 min or less when 0.5 to 1 g, preferably 0.6 to 0.9 g, and preferably 0.7 to 0.8 g of the borohydride is reacted with water in the presence of 0.5 to 1 g, preferably 0.6 to 0.9 g, and preferably 0.7 to 0.8 g of the nanocellulose catalyst. In some embodiments, the reacting forms a volume of at least 80 mL, preferably 85 mL, preferably 90 mL, preferably 95 mL, and preferably 100 mL of the $H_2$ gas in 15 min or less when 0.5 to 1 g, preferably 0.6 to 0.9 g, and preferably 0.7 to 0.8 g of the borohydride is reacted with water in the presence of 0.5 to 1 g, preferably 0.6 to 0.9 g, and preferably 0.7 to 0.8 g of the nanocellulose catalyst. In some embodiments, the reacting forms a volume of at least 100 mL of the hydrogen gas in 10 min or less when 0.5 to 1 g, preferably 0.6 to 0.9 g, and preferably 0.7 to 0.8 g of the borohydride is reacted with water in the presence of 0.5 to 1 g, preferably 0.6 to 0.9 g, and preferably 0.7 to 0.8 g of the nanocellulose catalyst.

In some embodiments, the nanocellulose catalyst has a hydrogen generate rate (HGR) of at least 200 mL/min·g. In another embodiment, the nanocellulose catalyst has an HGR of at least 300 mL/min·g, preferably at least 350 mL/min·g, preferably at least 400 mL/min·g, preferably at least 450 mL/min·g, preferably at least 500 mL/min·g, preferably at least 550 mL/min·g, preferably at least 600 mL/min·g, preferably at least 650 ml/min·g, preferably at least 700 mL/min·g, preferably at least 750 ml/min·g, preferably at least 800 mL/min·g, preferably at least 850 mL/min·g, preferably at least 900 mL/min·g, preferably at least 950 mL/min·g at a temperature of 25 to 40° C. In a specific embodiment, the nanocellulose catalyst has a HGR of 215 mL/min·g at a temperature of 25° C. In another specific embodiment, the nanocellulose catalyst has a HGR of at least 600 mL/min·g at a temperature of 35° C. In yet another specific embodiment, the nanocellulose catalyst has a HGR of at least 970 mL/min·g at a temperature of 40° C.

EXAMPLES

The following examples demonstrate a method of hydrolyzing a borohydride to produce $H_2$ gas. The examples are provided solely for illustration and are not to be construed as limitations of the present disclosure, as many variations thereof are possible without departing from the spirit and scope of the present disclosure.

Example 1: Method and Materials

The nanocomposite hydrogel described in the present disclosure was synthesized under ambient conditions. The method comprises dispersing nanocellulose crystals (NCC) and bentonite powder in water ($H_2O$) to form a uniform suspension. Citric acid ($C_6H_8O_7$) was then added as a cross-linker, and the mixture was stirred continuously to facilitate hydrogel formation. To prepare the nanocellulose catalyst (NCC-bentonite composite hydrogel), 1 g of NCC and 1 g of bentonite were dispersed in 150 mL of distilled water (DW) and stirred for 20 min to form a homogeneous mixture. 10 to 15 g of citric acid was added to the resultant mixture. The mixture was then heated at 60° C. for 30 min with continuous stirring to facilitate the crosslinking reaction. Subsequently, the hydrogel was frozen at −18° C. for 24 h to ensure proper gelation and stabilization of the structure.

Figure 2:
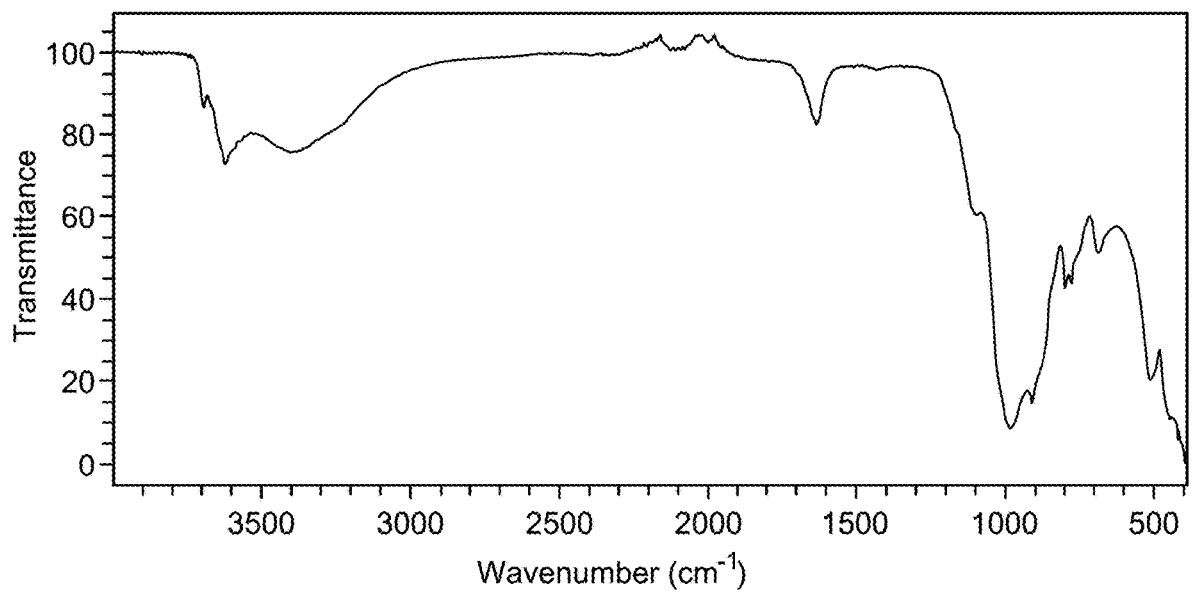
FIG. 2 shows a Fourier-transform infrared spectroscopy (FT-IR) of bentonite, according to certain embodiments.
Figure 3:
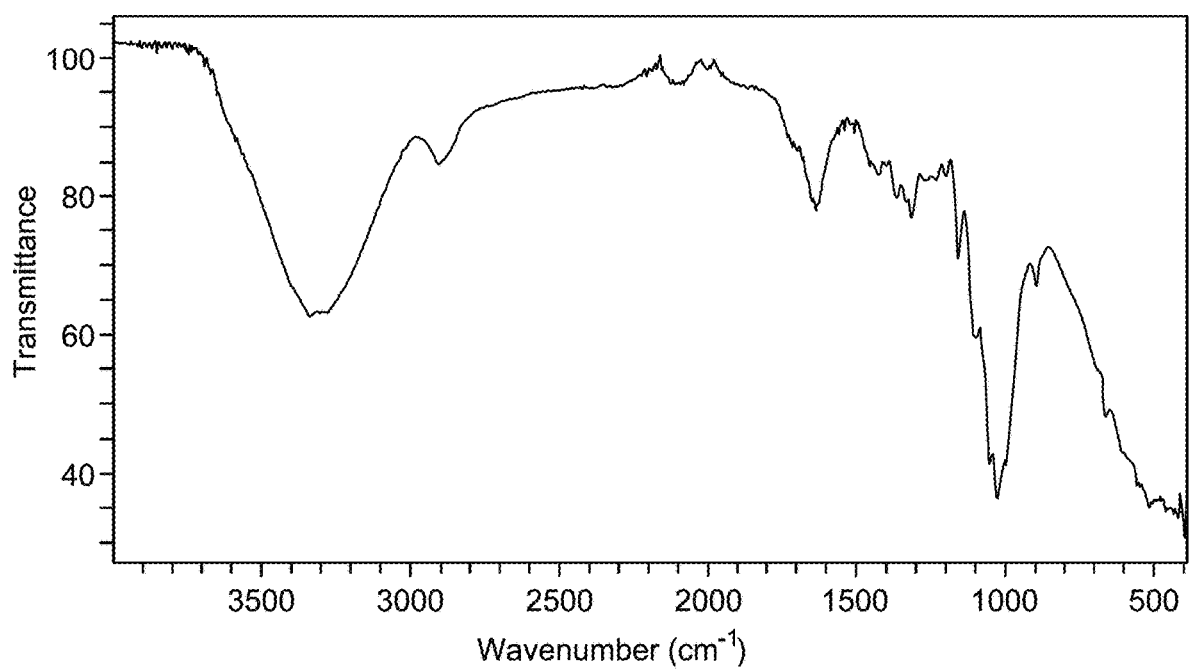
FIG. 3 shows a FT-IR spectrum of cellulose nanocrystal (NCC), according to certain embodiments.
Figure 4:
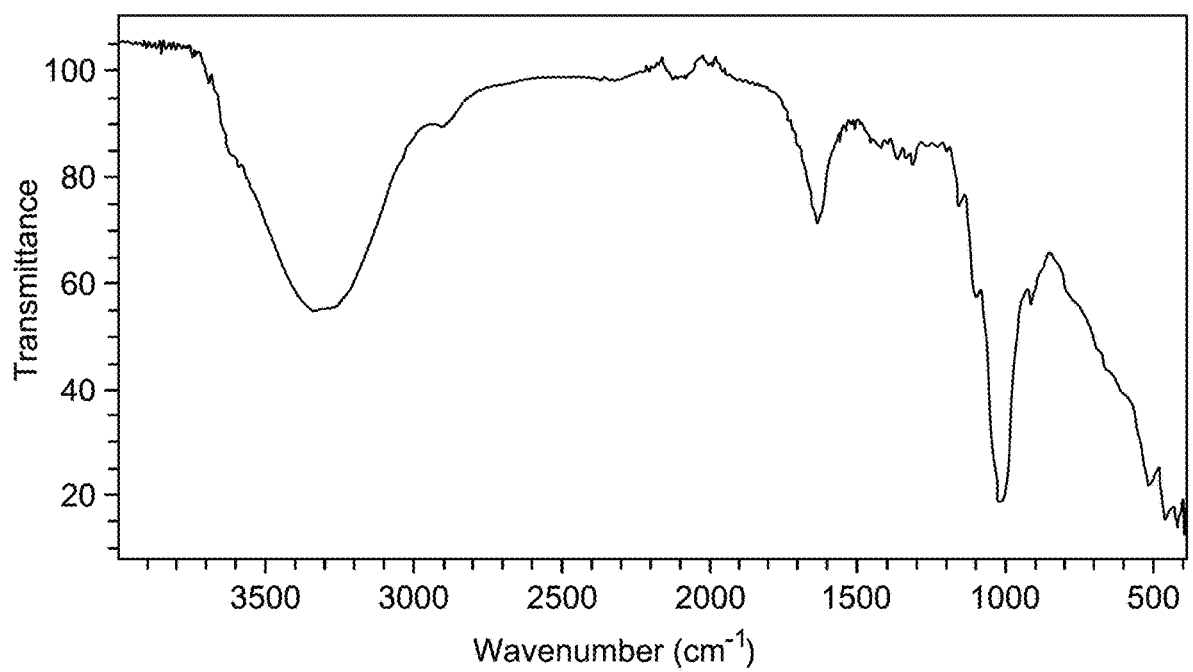
FIG. 4 shows a FT-IR spectrum of bentonite-cellulose composite hydrogel, according to certain embodiments.

Example 2: Nanocellulose-Bentonite (NCC-Bentonite) Composite Hydrogel Characterization Fourier transform infrared spectroscopy (FT-IR) spectra of the bentonite, NCC, and NCC-bentonite composite hydrogel were recorded, as shown in FIG. 2 through FIG. 4. The FT-IR spectrum of bentonite exhibits distinct absorption bands at 3650 per centimeter ($cm^{-1}$), 3400 $cm^{-1}$, 1633 $cm^{-1}$, 1045 $cm^{-1}$, 910 $cm^{-1}$, 770 $cm^{-1}$, 520 $cm^{-1}$, and 480 $cm^{-1}$, as shown in FIG. 2. The stretching vibration mode of the OH groups of the structural water of bentonite was responsible for the distinctive absorption peaks at 3600 $cm^{-1}$ and 3400 $cm^{-1}$. The band at 1633 $cm^{-1}$ was attributed to the bending vibration of water molecules. The FT-IR bands at 1045 $cm^{-1}$ and 910 $cm^{-1}$ were associated with Si—O and Al—OH bonds, respectively, while the bands at 770 $cm^{-1}$, 520 $cm^{-1}$, and 480 $cm^{-1}$ corresponded to Si—O—Al, Si—O—Mg, and Mg—O—Fe bonds, respectively. Further, FT-IR spectrum of the NCC, as shown in FIG. 3, revealed characteristic peaks of cellulose at 1054 $cm^{-1}$, 3439 $cm^{-1}$ and 2917 $cm^{-1}$. These peaks corresponded to the asymmetric stretching vibration of C—O—C, the stretching vibration of O—H, and stretching vibration of C—H, respectively. In the CNC-NBn hydrogel, as shown in FIG. 4. The intensity of most peaks decreased, except for peaks around 1690 cm$^{-1}$ to 1700 cm$^{-1}$, which increased slightly and became sharper. This new peak was attributed to the C=O stretching vibration, indicating the formation of an ester (—CO—O—) bond between the OH groups of CNC and the carboxylic groups of citric acid, thereby confirming the chemical crosslinking between CNC and citric acid. Additionally, FT-IR bands at 775 cm$^{-1}$, 530 cm$^{-1}$, and 460 cm$^{-1}$ corresponded to the Si—O—Al, Si—O—Mg, and Mg—O—Fe bonds of bentonite.

Figure 5:
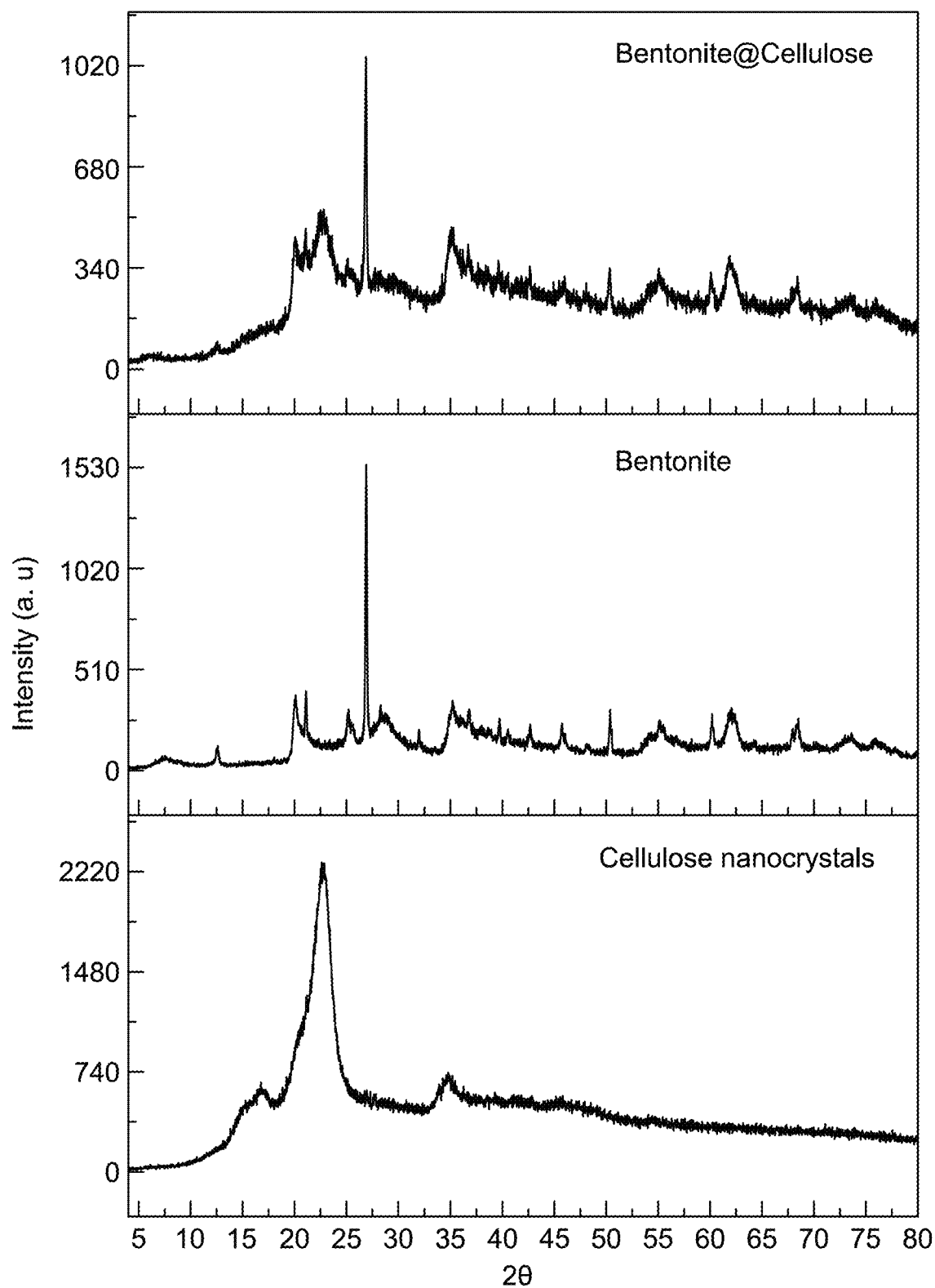
FIG. 5 shows an X-ray diffraction (XRD) pattern of nanocrystalline cellulose, bentonite, and bentonite-cellulose nanocomposite hydrogel, according to certain embodiments.

The structural characteristics of the prepared composites were further confirmed by X-ray diffraction (XRD), as shown in FIG. 5.

Example 3: Hydrogen Production with the NCC-Bentonite Composite Hydrogel

Figure 6A:
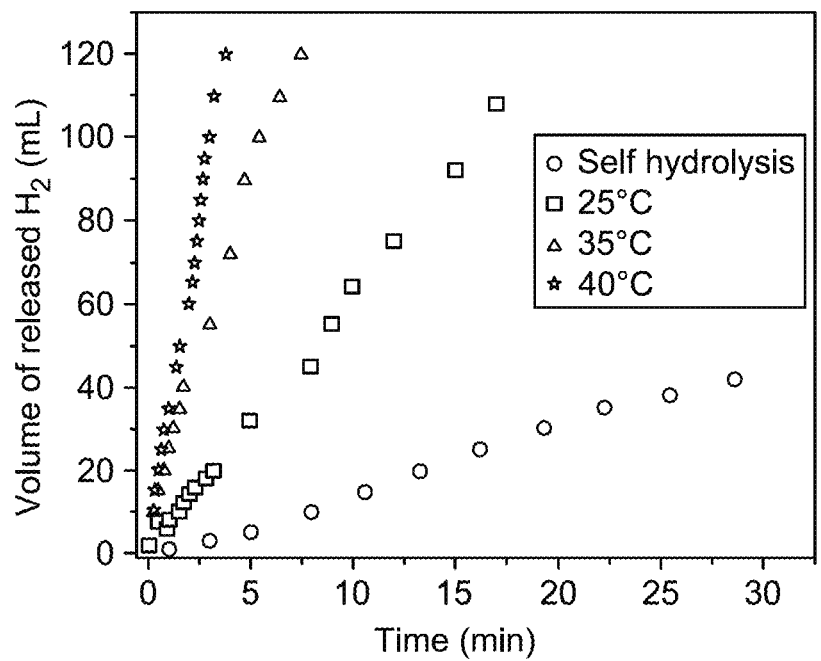
FIG. 6A shows the variation in the volume of liberated hydrogen ($H_2$) gas with reaction time over bentonite-nanocellulose composite hydrogel, according to certain embodiments.
Figure 6B:
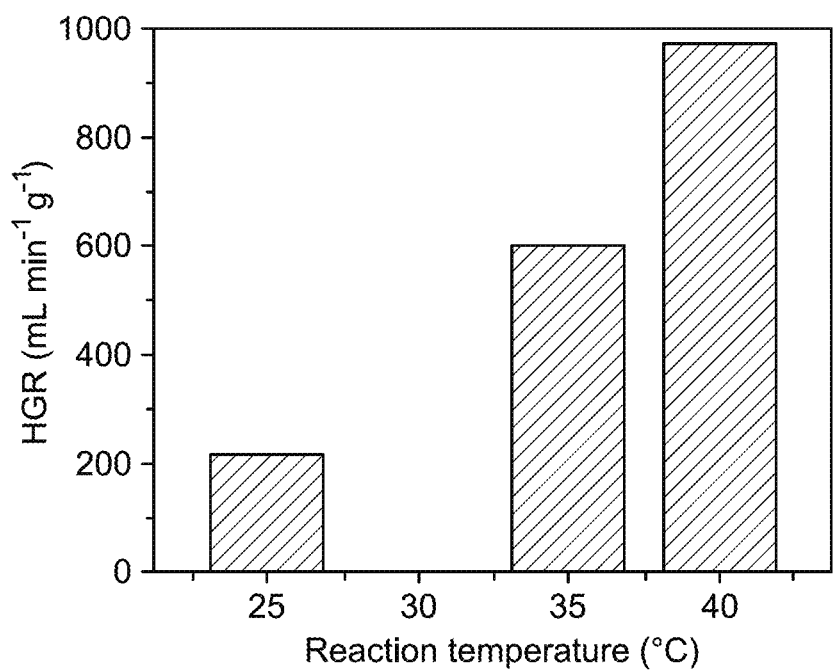
FIG. 6B is a column graph depicting variation in the hydrogen generation rate (HGR) with reaction temperature over bentonite-nanocellulose composite hydrogel, according to certain embodiments.

The hydrolysis of NaBH$_4$ with and without the presence of the NCC-bentonite composite hydrogel was examined, as shown in FIG. 6A through FIG. 6B. In FIG. 6A, the variation in the volume of liberated H$_2$ with reaction time over bentonite-nanocellulose composite hydrogel is depicted.

In these procedures, the volume of released H$_2$ was monitored at different time intervals and compared with the self-hydrolysis reaction. For the self-hydrolysis, at the specific temperature 0.5 g of NaBH$_4$ was mixed with 50 milliliters of deionized water (thermostated at 25° C.) and the amount of H$_2$ liberated was followed with reaction time. For the catalytic activity measurements, before each run, 30 mg of the bentonite-nanocellulose catalyst was thermostated at a given temperature. After that, 50 milliliters of deionized water 0.5 weight of NaBH$_4$, that had been thermostatized at the same temperature, was rapidly added to the catalyst vessel and attached to the glass apparatus (used for measuring the H$_2$ volume). The amount of H$_2$ that was released was measured at different reaction time across reaction temperatures of 25, 35, and 45° C. At the end of each run, the hydrogen generation rate (HGR) was calculated according to the following equation:

$$HGR(mL\ g^{-1}\ min^{-1}) = \frac{V(mL)}{t(min)X\ m(g)} \quad (1)$$

Where V is the total volume of released hydrogen, t is the time in minutes, and m is the catalyst mass in grams. Three repetitions of the tests were conducted to ascertain the rate at which H$_2$ was produced in the NaBH$_4$ hydrolysis reaction. The average of the findings obtained was used to calculate the reaction rates.

Figure 7A:
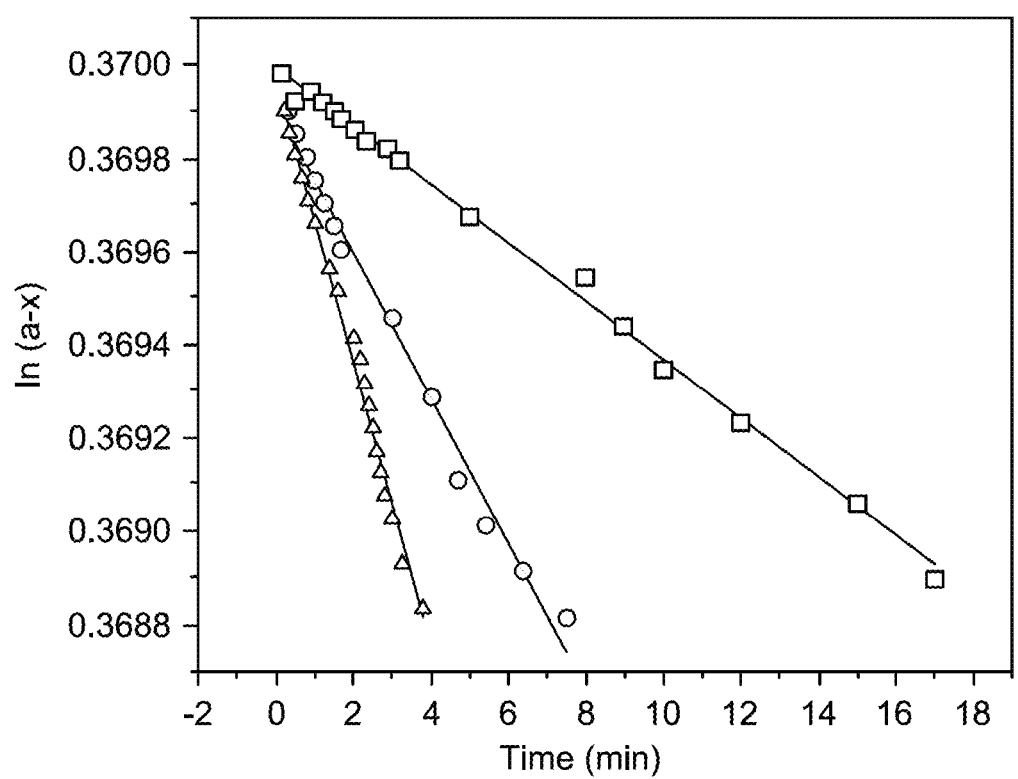
FIG. 7A is a pseudo first-order plot for the catalytic hydrolysis of sodium borohydride ($NaBH_4$) over bentonite-nanocellulose composite hydrogel, according to certain embodiments.
Figure 7B:
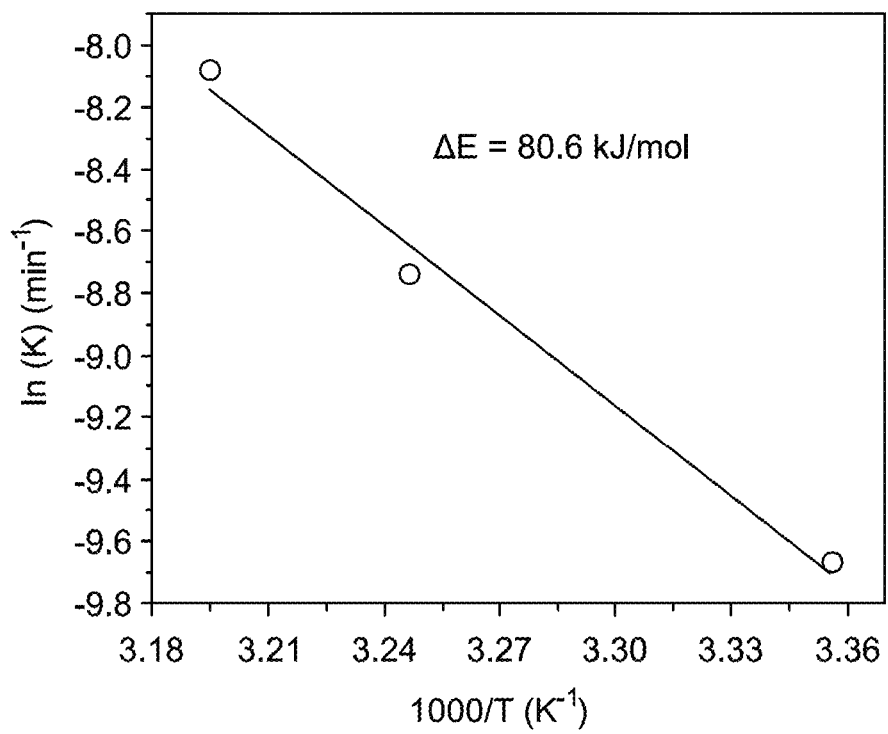
FIG. 7B is an Arrhenius plot for the catalytic hydrolysis of $NaBH_4$ over bentonite-nanocellulose composite hydrogel, according to certain embodiments.
Figure 8:
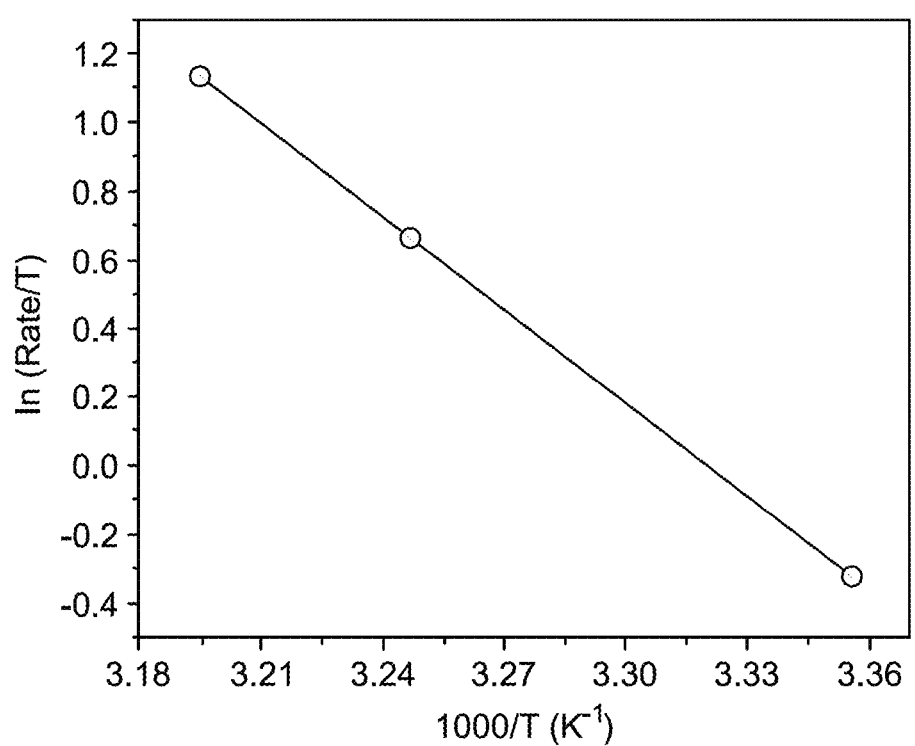
FIG. 8 depicts an Eyring plot for the catalytic hydrolysis of $NaBH_4$ over bentonite-nanocellulose composite hydrogel at a temperature ranging from 28 to 40° C., according to certain embodiments.

The composite catalytic action was evident in FIG. 6A, where the nanocellulose catalyst demonstrated catalytic activity greater than the self-hydrolysis process. Data analysis showed a steady increase in hydrogen gas volume over time. Furthermore, when the reaction temperature rises, the catalytic hydrolysis reaction intensified. Using 0.7 g of NaBH$_4$, the evaluations showed that HGR values of 215 mL/min·g, 600 mL/min·g, and 970 mL/min·g were obtained at 25° C., 35° C., and 40° C., respectively, as shown in FIG. 6B. FIG. 7A is a pseudo first order plot for the catalytic hydrolysis of NaBH$_4$ over NCC-bentonite composite hydrogel. FIG. 7B is an Arrhenius plot for the catalytic hydrolysis of NaBH$_4$ over NCC-bentonite composite hydrogel. The reaction was found to proceed according to a first-order kinetics with an activation energy 80.6 kJ/mol, as shown in FIG. 7A through FIG. 7B. Thermodynamic parameters were estimated from the application of Eyring equation on the catalytic reaction, as shown in FIG. 8. The estimated values of $\Delta H^{\#}$ and $\Delta S^{\#}$ were 75.4 KJ/mol and 0.26 KJ/mol·K, respectively, while the estimated values of $\Delta G^{\#}$ were −2.1 kJ/mol, −4.7 KJ/mol, and −5.9 kJ/mol, respectively at 25° C., 35° C., and 40° C. The obtained results indicate that the hydrolysis of borohydride over NCC-bentonite composite hydrogel is endothermic, entropy-driven, and spontaneous, illustrating the efficiency of the synthesized nanocellulose catalyst.

Numerous modifications and variations of the present disclosure are possible in light of the above teachings. It is, therefore, to be understood that within the scope of the appended claims, the invention may be practiced otherwise than as specifically described herein.

The invention claimed is:

1. A method of hydrolyzing a borohydride, comprising:
    extracting nanocellulose from date palm waste and forming nanocellulose crystals therefrom;
    dispersing the nanocellulose crystals and bentonite powder in water, then adding a cross-linking acid solution and heating to obtain a nanocellulose catalyst in the form of a hydrogel, then reacting a borohydride with water in the presence of the nanocellulose catalyst at a temperature of 20 to 45° C. to obtain hydrogen gas,
    wherein the borohydride is at least one selected from the group consisting of sodium borohydride, lithium borohydride, calcium borohydride, potassium borohydride, rubidium borohydride, and ammonium borohydride.

2. The method of claim 1, wherein the cross-linking acid solution comprises at least one selected from the group consisting of citric acid, oxalic acid, tartaric acid, and formic acid.

3. The method of claim 1, wherein the dispersing comprises dispersing a weight ratio of 1:3 to 3:1 of nanocellulose crystals to bentonite in water.

4. The method of claim 1, wherein the nanocellulose catalyst is obtained by heating a mixture of the nanocellulose crystals, bentonite powder, water and the cross-linking acid solution to a temperature of 55 to 65° C. for 15 to 45 min.

5. The method of claim 1, wherein the borohydride is sodium borohydride.

6. The method of claim 1, wherein the nanocellulose catalyst is characterized by a FT-IR spectrum comprising a sharp peak at 1690 to 1700 cm$^{-1}$.

7. The method of claim 1, wherein the cross-linking acid solution comprises citric acid.

8. The method of claim 1, wherein the dispersing comprises dispersing a weight ratio of 1:1 of nanocellulose crystals to bentonite in water.

9. The method of claim 1, wherein the reacting comprises reacting the borohydride with water in the presence of the nanocellulose catalyst at a temperature of 40° C. to form hydrogen gas.

10. The method of claim 1, wherein the reacting forms a volume of 10 to 120 mL of the hydrogen gas in 20 min or less when 0.5 to 1 g of the borohydride is reacted with water in the presence of 0.5 to 1 g of the nanocellulose catalyst.

11. The method of claim 1, wherein the reacting of the borohydride with water in the presence of the nanocellulose catalyst has an activation energy of 75 to 85 KJ/mol.

12. The method of claim 1, wherein the reacting forms a volume of at least 60 mL of the hydrogen gas in 5 min or less when 0.5 to 1 g of the borohydride is reacted with water in the presence of 0.5 to 1 g of the nanocellulose catalyst.

13. The method of claim 1, wherein the reacting of the borohydride with water in the presence of the nanocellulose catalyst has a change in enthalpy ($\Delta H$) of 70 to 80 KJ/mol.

14. The method of claim 1, wherein the nanocellulose catalyst is obtained by dispersing nanocellulose crystals and bentonite powder in water then adding a cross-linking acid solution in a weight ratio of 1:15 to 15:1 nanocellulose crystals and bentonite powder in water to cross-linking acid solution.

15. The method of claim 1, wherein the nanocellulose catalyst is obtained by heating a mixture of the nanocellulose crystals, bentonite powder, water and the cross-linking acid solution to a temperature of 60° C. for 30 min.

16. The method of claim 1, wherein the reacting forms a volume of at least 100 mL of the hydrogen gas in 10 min or less when 0.5 to 1 g of the borohydride is reacted with water in the presence of 0.5 to 1 g of the nanocellulose catalyst.

17. The method of claim 1, wherein the reacting of the borohydride with water in the presence of the nanocellulose catalyst has a change in entropy ($\Delta S$) of 0.05 to 0.45 KJ/mol·K.

18. The method of claim 1, wherein the dispersing comprises dispersing the nanocellulose crystals and bentonite powder in water, then adding a cross-linking acid solution in a weight ratio of 1:15 to 1:10 nanocellulose crystals and bentonite powder in water to cross-linking acid solution.

19. The method of claim 1, wherein the reacting forms a volume of at least 80 mL of the hydrogen gas in 15 min or less when 0.5 to 1 g of the borohydride is reacted with water in the presence of 0.5 to 1 g of the nanocellulose catalyst.

20. The method of claim 1, wherein the nanocellulose catalyst has a hydrogen generate rate of at least 200 mL/min·g.

* * * * *